United States Patent
Ooi

(10) Patent No.: US 8,161,234 B2
(45) Date of Patent: Apr. 17, 2012

(54) DYNAMICALLY SWITCHING COMMAND TYPES TO A MASS STORAGE DRIVE

(75) Inventor: Eng Hun Ooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 12/590,192

(22) Filed: Nov. 4, 2009

(65) Prior Publication Data

US 2010/0169566 A1 Jul. 1, 2010

(51) Int. Cl.
G06F 12/00 (2006.01)

(52) U.S. Cl. .............................. 711/112; 711/156; 710/5

(58) Field of Classification Search .................. 711/112, 711/156; 710/5
See application file for complete search history.

(56) References Cited

U.S. PATENT DOCUMENTS

| | | | |
|---|---|---|---|
| 6,792,503 B2 * | 9/2004 | Yagi et al. ...................... | 711/112 |
| 7,320,050 B2 * | 1/2008 | Kobayashi et al. ............ | 711/112 |
| 7,418,545 B2 * | 8/2008 | Marushak et al. ............ | 711/112 |
| 7,694,026 B2 * | 4/2010 | Huffman ........................... | 710/5 |
| 7,711,894 B1 * | 5/2010 | Huang et al. .................. | 711/112 |
| 7,747,788 B2 * | 6/2010 | Chang et al. ...................... | 710/5 |
| 2005/0117463 A1 * | 6/2005 | Sasaki ........................ | 369/30.27 |
| 2006/0095658 A1 * | 5/2006 | Marushak et al. ............ | 711/112 |
| 2007/0011360 A1 * | 1/2007 | Chang et al. ...................... | 710/5 |
| 2007/0260756 A1 * | 11/2007 | Tseng et al. ...................... | 710/5 |
| 2008/0201341 A1 * | 8/2008 | Okamoto et al. ............ | 707/100 |

* cited by examiner

Primary Examiner — Stephen Elmore
(74) Attorney, Agent, or Firm — Kacvinsky Daisak, PLLC

(57) ABSTRACT

A method, device, and system are disclosed. In one embodiment method begins by receiving a first new mass storage disk access request. The method then determines the total number of access requests to the mass storage disk received in a window of time. If the total number of requests received over the period of time is greater than or equal to a request threshold number then a request frequency counter is decremented. Otherwise, the counter is incremented. The method continues by generating a legacy advanced technology attachment (ATA)-type command for the first new access request when the counter is greater than or equal to a counter threshold number. Otherwise, the method generates a native command queue (NCQ)-type command for the first new access request.

21 Claims, 4 Drawing Sheets

DYNAMICALLY SWITCHING COMMAND TYPES TO A MASS STORAGE DRIVE

RELATED APPLICATIONS

This application is related to and claims priority to Malaysian Application No.: PI 20085359 filed on Dec. 30, 2008 and titled "DYNAMICALLY SWITCHING COMMAND TYPES TO A MASS STORAGE DRIVE"; this application is entirely incorporated by reference.

FIELD OF THE INVENTION

The invention relates to generating commands sent to a mass storage drive.

BACKGROUND OF THE INVENTION

Mass storage devices such as hard disk drives are many times the slowest link in an operational computer system. As hard disk drive access latency gets worse, total computer system performance generally declines because the fast processor and memory in the computer system have to frequently sit idle waiting for the disk drive to provide access to data. Thus, any type of performance improvement in hard disk input/output (I/O) may provide an overall improvement of the performance of the computer system as a whole.

Disk drives have historically utilized ATA (Advanced Technology Attachment)-type commands. Recently, a new set of commands were introduced for serial ATA (SATA) hard disk drives using the AHCI (Advanced Host Controller Interface) called native command queueing (NCQ). NCQ-type commands were designed to increase performance in dealing with large bursts of disk access requests. Though burst performance may have improved, NCQ-type commands do not tend to perform well when access requests trickle in one at a time or arrive together in low numbers.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
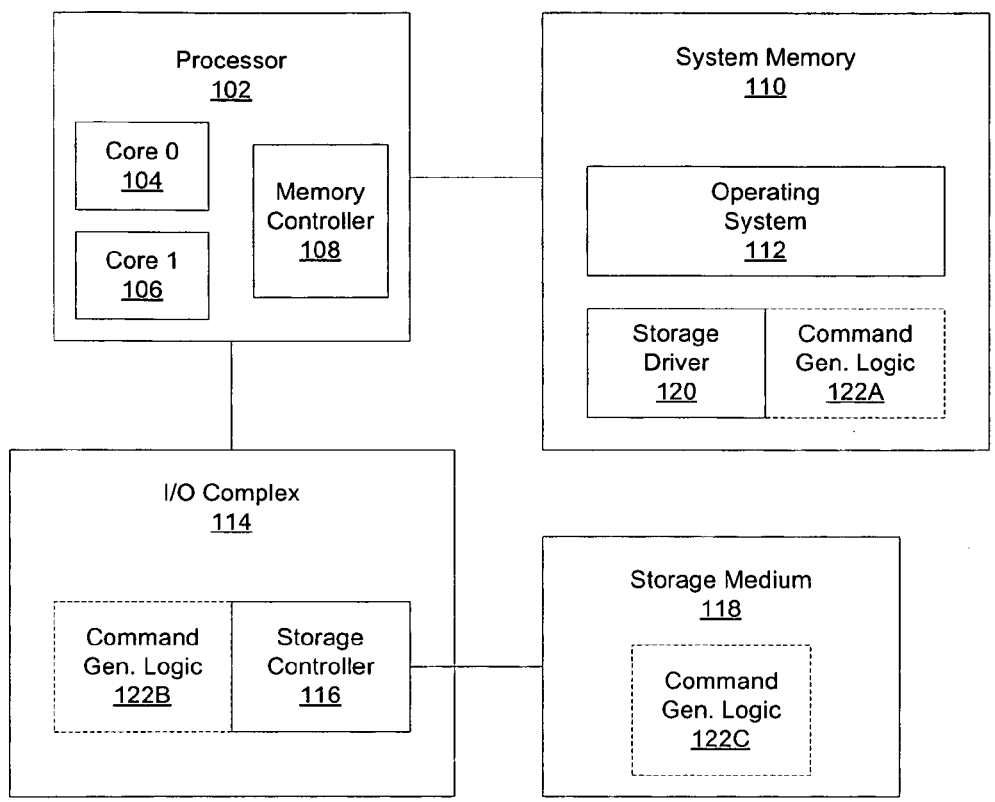
FIG. 1 describes an embodiment of a computer system and device to dynamically switch command types sent to a mass storage device based on the frequency of access requests.

Embodiments of a method, device, and system to dynamically switch command types sent to a mass storage device based on the frequency of access requests are disclosed.

Current systems utilizing SATA mass storage hard disks generally check to see if the hard disk drive is NCQ-compatible during boot. If the hard drive is NCQ-compatible, then the hard disk driver is set to send NCQ-type commands to the hard drive. If the hard drive is not NCQ-compatible, then the hard disk driver is set to send non-NCQ-type commands to the hard drive. This may be inefficient because hard disk access requests do not arrive in uniform patterns and, depending on the workload, access requests can increase or decrease in frequency over time. Because ATA-type commands are more efficient with single commands or a low number of total commands over a window of time, it would be beneficial to utilize ATA-type commands when few access requests are received. Alternatively, because NCQ-type commands are more efficient with significant bursts of several commands, it would be beneficial to utilize NCQ-type commands when several access requests are received.

Thus, logic may dynamically monitor the frequency of incoming hard drive access requests during operation of the computer system. Over a given predetermined window of time, the logic may determine that enough access requests have arrived that a most recently arrived request should be sent to the hard drive using an NCQ command. On the other hand, over the same window of time, the logic may determine that there have not been enough access requests arrive to justify an NCQ command and, instead, the most recently arrived request should be sent to the hard drive using an ATA command. This determination can be ongoing during operation per access request arrival. Thus, the logic may switch back and forth between utilizing ATA commands and NCQ commands as the frequency of the access requests changes.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with, each other, but yet still cooperate or interact with each other.

FIG. 1 describes an embodiment of a computer system and device to dynamically switch command types sent to a mass storage device based on the frequency of access requests. The computer system 100 may include a processor, such as processor 102. In other embodiments that are not shown, the computer system may include two or more processors. Processor 102 may be an Intel®-based central processing unit (CPU) or another brand CPU. In different embodiments, processor 102 may have one or more cores. For example, FIG. 1 shows processor 102 with two cores: core 0 (104) and core 1 (106).

Figure 2:
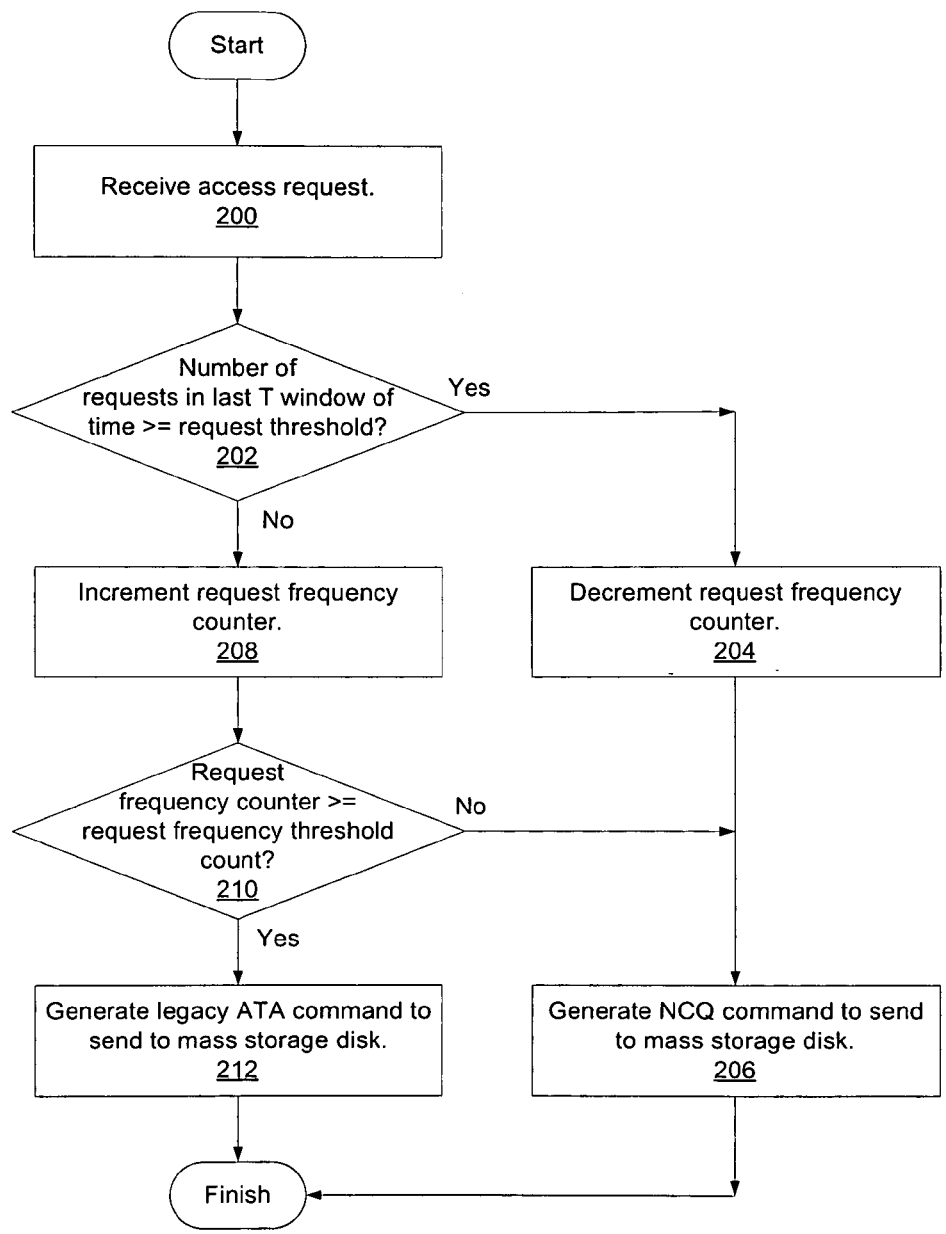
FIG. 2 is a flow diagram of an embodiment of a process to dynamically switch command types sent to a mass storage device based on the frequency of access requests.

Processor 102 is coupled to a memory subsystem through memory controller 108. Although FIG. 2 shows memory controller 108 integrated into processor 102, in other embodiments that are not shown, the memory controller may be integrated into a bridge device or other device in the computer system that is discrete from processor 102. The memory subsystem includes system memory 110 to store instructions to be executed by the processor. The memory devices in the memory subsystem may be any type of volatile dynamic random access memory (DRAM), for example double data rate (DDR) synchronous DRAM, and/or any type of non-volatile memory, for example a form of Flash memory. The processor(s) is coupled to the memory by a processor-memory interface, which may be a link (i.e. an interconnect/bus) that includes individual lines that can transmit data, address, control, and other information between the processor(s) and the memory.

The host operating system (OS) 112 is representative of an operating system that would be loaded into the memory of the computer system 100 while the system is operational to provide general operational control over the system and any peripherals attached to the system. The host OS 112 may be a form of Microsoft® Windows®, UNIX, LINUX, or any other functional OS. The host OS 112 provides an environment in which one or more programs, services, or agents can run within.

A logic complex 114 may include multiple integrated controllers for managing the I/O subsystem within the local computer system 100. Each subsystem coupled to the logic complex 114 may interface with the rest of the hardware within the local computer system 100 using one or more controllers. For example, storage controller 116 may be a SATA (serial advanced technology attachment) controller to allow the computer system to communicate with storage medium 118, which may be a SATA hard disk drive. In this embodiment, a storage driver 120 may be resident within system memory system memory 110 to provide a software interface for the host OS 112 to communicate with the storage medium 118. In many embodiments, the file system utilized to stored files within the storage medium 118 may be a Microsoft® NTFS-based file system. In other embodiments, there may be another type of file system to store files within the storage medium 118.

To access files stored in the storage medium 118, the host OS 112 will send one or more data access requests to the storage driver 120. The storage driver will then convert the access request to specific commands to be sent to the storage medium 118. Generally, the storage driver 120 generates a command, and then sends the generated command to the storage controller 116 in the I/O complex 114. The storage controller 116, receives the command and forwards it to the actual storage medium 118, which in many cases is a hard disk drive.

In many embodiments, additional command generation logic 122 may be present in the computer system 100. In some embodiments, the additional command generation logic 122A may be present within the system memory 108 and communicatively coupled to the storage driver 120. The command generation logic may dynamically monitor the frequency with which the host OS 112 is sending data access requests to the storage driver 120. Depending on this frequency, the command generation logic 122A may make modifications to the types of commands being generated to service the host OS 112 requests.

For example, in many embodiments, the storage medium 118 may be a SATA hard disk drive capable of servicing received commands in either a legacy ATA format or in a NCQ format. Instead of utilized either the legacy ATA format or the NCQ format exclusively, the command generation logic 122A may dynamically alter the command format being sent to the storage medium based on the frequency of access requests coming from the host OS 112 (or from elsewhere).

The NCQ format generally is efficient and optimized in performance for bursts of access requests and may suffer performance degradation if access requests come in individually and/or slowly. In cases where access requests to the storage medium 118 do come in individually and/or slowly, legacy ATA commands may have better performance. Thus, the command generation logic 122A may determine the frequency of the access requests received by the storage driver 120 and make a decision per access request whether to have the storage driver 120 generate an ATA-type command or a NCQ-type command.

The determination regarding the type of command to generate can be made utilizing a number of different specific factors, but generally, the frequency of the receipt of access requests may be at least one of the factors utilized. For example, the command generation logic 122A may keep track of a running timer and utilize a window of time to check the frequency of incoming access requests. The command generation logic 122A may have a buffer that tracks all incoming requests and keeps a count of the number of requests that have been received within the window of time. Specifically, the timer may be a hardware system timer, an operating system generated timer, or another timer. The timer may start (or be reset) and the command generation logic 122A may actively monitor the timer or be notified that the timer has reached a predetermined timer limit. Between the start time of the timer and when the timer reaches the limit time, the command generation logic 122A may count the number of access requests arriving.

In some embodiments, if the number of access requests exceeds (or reaches) a threshold count, the number of commands received in the window of time may be determined to be frequent enough where NCQ generated commands would be more efficient. On the other hand, if the number of access requests is below the threshold count, the number of commands received in the window of time may be determined to be infrequent enough where ATA generated commands would be more efficient. In many embodiments, the number of received access requests is saved in a buffer and the window of time may be a moving window. For example, the number of access requests in the window of time may be determined as a result of a new access request arriving at the storage driver 120. In this example, for each access request received at the storage driver 120 from the host OS 112 and elsewhere, the window of time may be a window starting at a T time prior to the arrival of the most recent access request and ending at the time the latest access request was received. Thus, for each access request received, the window of time utilized in the access request frequency calculation may be different. In other embodiments, the window of time may be a set window that revolves around processor cycles or another metric. Thus, the window of time may equal a window of 1,000 processor cycles, beginning and ending at specific cycles.

However the window of time is determined, once the number of access requests to the storage medium 118 has been determined for the window, the command generation logic 122A will have the knowledge of how frequent the access requests have been and be able to make a command generation decision based on that information. In many embodiments, the threshold frequency of access requests may be a predetermined threshold number based on performance tests and other information. For example, in one embodiment, the threshold value of access requests may be four. In this embodiment, if an access request is received and the number of access requests received in the most recent window of time is greater than or equal to four access requests, then the command generation logic may generate a NCQ-type command based on the received access request. If the number of access requests in the most recent window of time is less than four access requests, then the command generation logic may generate an ATA-type command based on the received access request.

In other embodiments, additional logic may be implemented to potentially lessen the number of transitions between generating NCQ commands and generating ATA commands. In many of these transition-limiting embodiments, a request frequency counter may be implemented. The request frequency counter, which would generally be an internal counter within the command generation logic 122A, would be utilized to count a number of windows of time where the threshold, number of access requests has and has not been met.

For example, at the start of a number of windows of time, the request frequency counter may be reset to zero. Then, in a first window of time, the threshold number of transactions needed to justify generating NCQ-type commands is reached. Thus, for the first window of time, command generation logic 122A may increment the request frequency counter (which would set the counter at one). In a second window of time, the threshold number of transactions needed to justify generating NCQ-type commands is also reached. Thus, for the second window of time, command generation logic 122A may increment the request frequency counter again (which would set the counter at two). In a third window of time, the threshold number of transactions needed to justify generating NCQ-type commands is not reached. Thus, for the third window of time, command generation logic 122A may decrement the request frequency counter (which would set the counter at one).

This logical loop may continue through each subsequent window of time and when the request frequency counter is modified, the command generation logic 122A may compare the current count against a request frequency counter threshold count. If the threshold count has been reached, then a newly arriving access request may be generated in a NCQ-type command. If the threshold count has not been reached, then a newly arriving access request may be generated in a ATA-type command. This request frequency counter logic within the command generation logic may limit the number of dynamic transitions between ATA-type command generation and NCQ-type command generation. Specifically, depending on the request frequency counter threshold count, it might take several windows of time in which there the number of access requests has met or exceeded the threshold number of requests in the window to justify generating a NCQ-type command. Alternatively, the determination of what conditions increment and decrement the counter may be reversed. This difference would allow the system to default in generating either NCQ-type commands or ATA-type commands and require a number of windows of time where a threshold was exceeded (or equaled) for the type of command generated to change. In other words, depending on the implementation, ATA-type commands may start as the default type or NCQ-type commands may start as the default type.

Although in the examples discussed above the command generation logic 122A was located within the system memory 110 and communicatively coupled to the storage driver 120, in other embodiments, the command generation logic 122B may be located within the I/O complex 114 and be communicatively coupled to the storage controller 116 logic. In yet other embodiments, the command generation logic 122C may be located within the storage medium 118 and be communicatively coupled to logic within the storage medium 118.

In many embodiments, the storage driver 120, the storage controller 116, and the storage medium 118 all include buffers to store incoming access requests and commands respectively. When a burst of requests/commands arrives, the buffer(s) is helpful to store the excess requests/commands while they are each serviced one at a time. In many embodiments, this chain requires all requests/commands currently stored and in process to be completed (serviced) by the storage medium 118 prior to switching command types. Thus, the storage medium 118 may issue a communication to the storage driver 120 (e.g. in the form of an interrupt) to notify the driver that all pending commands have been completed and the storage medium is waiting for further commands. At this time, the storage driver 120 may switch command types that are sent to the storage medium if a command-type switch is warranted.

In many embodiments, during system boot, logic within the storage driver 120 or within the command generation logic 122 may check to see if the mass storage device supports NCQ type commands and, if so, implements the dynamic command type changing process through the command generation logic 122. Otherwise, if the mass storage device does not support NCQ type commands, then the command generation logic 122 is not activated and may remain dormant during system operation.

FIG. 2 is a flow diagram of an embodiment of a process to dynamically switch command types sent to a mass storage device based on the frequency of access requests. The process is performed by processing logic which may be hardware, software, or a combination of both. The process begins by processing logic receiving an access request to access the mass storage device (e.g. a hard disk drive) (processing block 200). In many embodiments, the access request originates from a host OS or from a software application in the same computer system containing the processing logic. In other embodiments, the access request may be from a remote entity. Next, processing logic determines whether the number of requests that have been received over the course of a window of time (of T length) prior to the currently received access request is greater than or equal to a threshold number of requests (processing block 202). The threshold number of requests may be predetermined and programmed into processing logic. If the number of requests is greater than or equal to the threshold then the request frequency counter may be decremented (processing block 204).

In some embodiments, the request frequency counter may be initialized at zero at system boot or at a later time. In other embodiments, the request frequency counter may be initialized and also reset at a starting value other than zero to prime the likelihood that either an ATA or an NCQ command is generated. In some embodiments, when the counter reaches zero an NCQ command is generated for the received access request. In many embodiments, after the frequency counter is decremented, processing logic generates an NCQ command to send to the mass storage disk (processing block 206).

Returning to block 202, if the number of requests that have been received over the course of the window of time (of T length) prior to the currently received access request is less than to the threshold number of requests, then processing logic increments the request frequency counter (processing block 208). Then processing logic determines whether the request frequency counter is greater than or equal to a request frequency threshold count (processing block 210). If the counter is greater than or equal to the request frequency threshold count, then processing logic generates a legacy ATA command to send to the mass storage disk (processing block 212). Otherwise, if the request frequency counter is less than the request frequency threshold count, then processing logic generates an NCQ command to send to the mass storage disk (processing block 206) and the process is finished. In some embodiments, if the counter is currently at the threshold count and processing logic attempts to increment the count further, logic may leave (i.e. reset) the counter at the threshold count.

The request frequency counter may be implemented in a number of ways. For example, in the current process discussed in FIG. 2, the request frequency counter is incremented each time less than a threshold number of requests have been received in the window of time prior to the currently received access request. In other embodiments that are not shown, the request frequency counter may be implemented using the opposite methodology, where the counter is incremented each time at least a threshold number of requests have been received in the window of time prior to the currently received access request. This change in implementation just reverses what the counter represents (i.e. high counter values may either indicate a lower number of requests received in the window of time or indicate a higher number of requests received in the window of time). Additionally, although the counter initialization and resetting processes are not shown in FIG. 2, the counter can be reset to any value necessary. Depending on the reset value, the process may more heavily lean toward generating NCQ commands or lean toward generating ATA commands.

Figure 3:
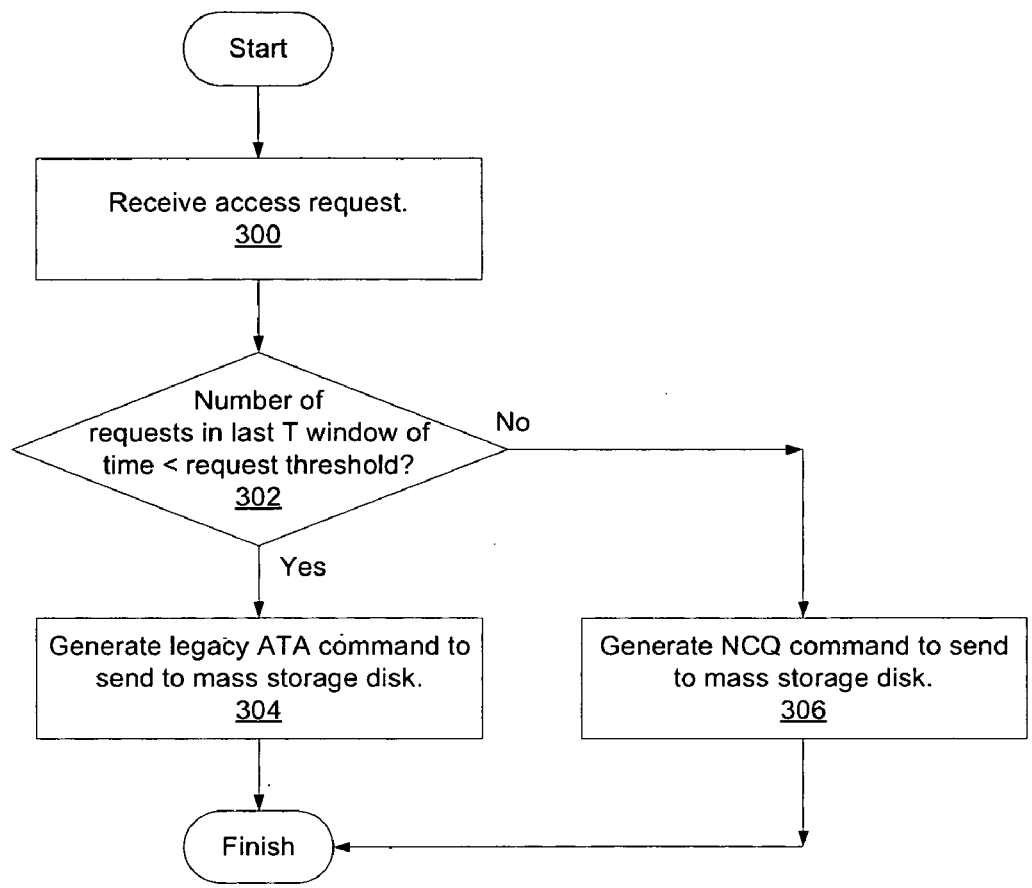
FIG. 3 is a flow diagram of another embodiment of a process to dynamically switch command types sent to a mass storage device based on the frequency of access requests.

FIG. 3 is a flow diagram of another embodiment of a process to dynamically switch command types sent to a mass storage device based on the frequency of access requests. The process is performed by processing logic which may be hardware, software, or a combination of both. The process begins by processing logic receiving an access request to access the mass storage device (e.g. a hard disk drive) (processing block 300).

Next, processing logic determines if the number of requests that have been received over the course of a window of time (of T length) prior to the currently received access request is less than a threshold number of requests (processing block 302). The threshold number of requests may be predetermined and programmed into processing logic.

If the number of requests received in the window of time is less than the threshold number of requests, then processing logic generates a legacy ATA command to send to the mass storage disk (processing block 304). Otherwise, if the number of requests received is greater than or equal to the threshold number of requests, then processing logic generates an NCQ command to send to the mass storage disk (processing block 306) and the process is complete.

Figure 4:
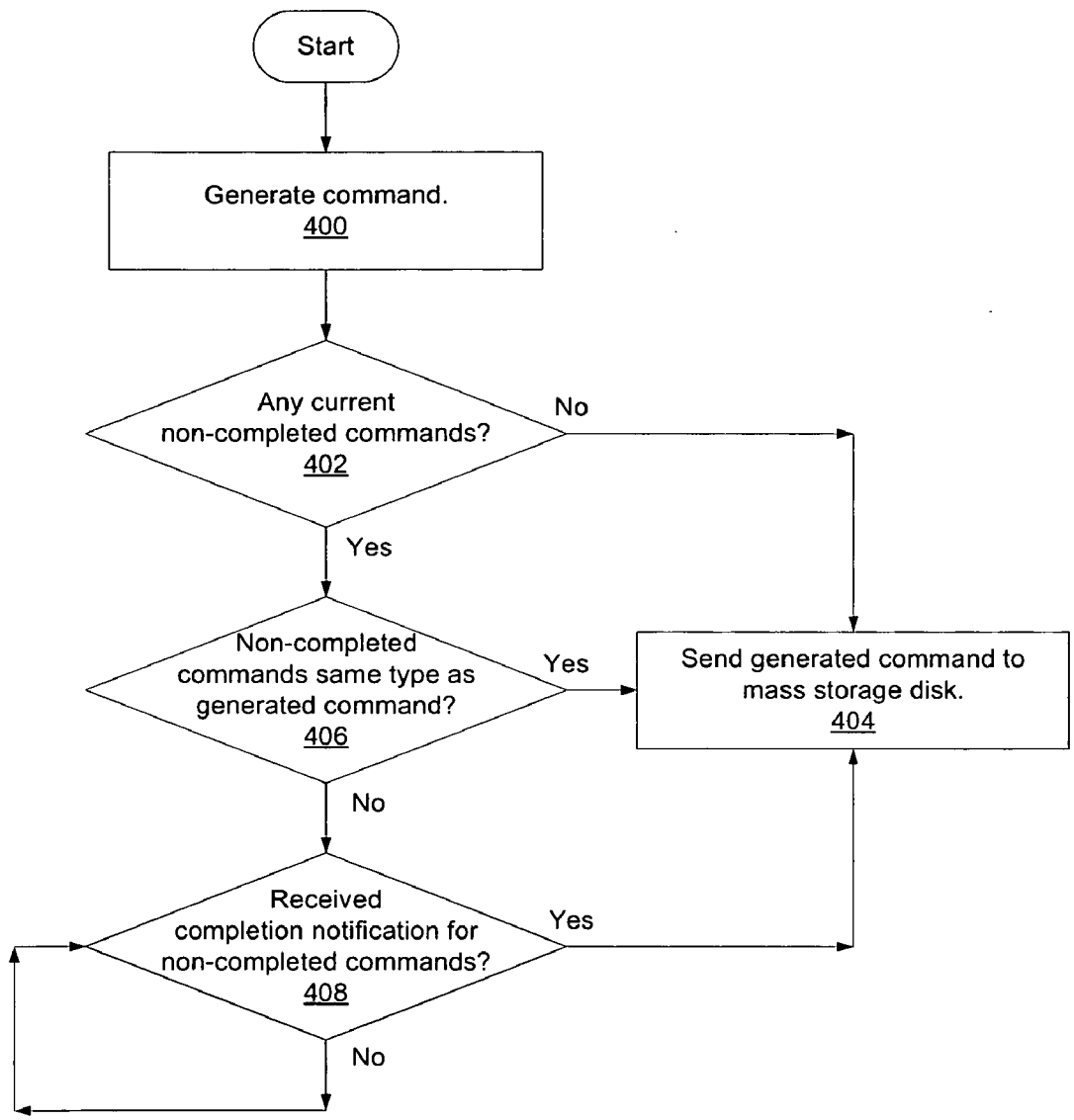
FIG. 4 is a flow diagram of an embodiment of a process to determine whether to wait for pending commands that have already been sent to a mass storage device prior to sending new commands of a given type.

FIG. 4 is a flow diagram of an embodiment of a process to determine whether to wait for pending commands that have already been sent to a mass storage device prior to sending new commands of a given type. The process is performed by processing logic which may be hardware, software, or a combination of both. The process begins by processing logic generating a command to send to the mass storage device (e.g. a hard disk drive) (processing block 400). Generally, this step can be considered as the generation step in FIGS. 2 and 3 (blocks 206 or 212 in FIG. 2 and blocks 304 and 306 in FIG. 3).

Once the command has been generated, processing logic determines whether there are any current commands that are pending (i.e. not completed). Commands sent from a storage driver (block 120 in FIG. 1) to a storage medium (block 118 in FIG. 1) take a certain amount of time between being sent from the driver to being serviced and completed by the storage medium (i.e. the mass storage device/disk). Thus, any command that has been sent to the mass storage disk and has not completed is pending. Processing logic may determine whether any pending commands are still outstanding in any number of ways. For example, the storage driver (block 120 in FIG. 1) may keep a stored list of commands sent to the mass storage disk. For each command sent, the mass storage disk may send a communication to the storage driver when it has been serviced and completed (through a communication channel such as an interrupt or other communication message). Once each communication per completed command is received by the storage driver, the driver may erase the command from the stored list of sent commands. Thus, if the stored list of sent commands is empty, the storage driver would know that there are currently no non-completed (pending) commands.

If there are no pending commands, then processing logic sends the generated command to the mass storage disk (processing block 404). Otherwise, if there are one or more non-completed commands pending, then processing logic determines whether each of the non-completed commands are the same type as the generated command (processing block 406). If all non-completed commands are the same type as the generated command, then processing logic sends the generated command to the mass storage disk (processing block 404). In other words, if the generated command is an ATA command, then all pending commands must also be ATA commands for the generated command to be immediately sent. Otherwise, if the generated command is a NCQ command, then all pending commands must also be NCQ commands for the generated command to be immediately sent.

If any of the non-completed commands are of a different type, then processing logic waits for the non-completed commands to complete. Thus, processing logic determines whether completion notification communications have been received for each of the non-completed commands (processing block 408). Processing logic continues to wait and check for completion indications from each of the non-completed commands. Once all pending commands have completed (i.e. no pending commands remain), then processing logic sends the generated command to the mass storage disk (processing block 404) and the process is finished.

Thus, embodiments of a method, device, and system to dynamically switch command types sent to a mass storage device based on the frequency of access requests are disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:
1. A method, comprising:
receiving a first new access request to a mass storage disk;
determining a total number of access requests to the mass storage disk received in a window of time, the window of time starting at a first point in time and ending at the time of the receipt of the first new access request;
decrementing a request frequency counter when the total number of access requests received over the period of time is greater than or equal to a request threshold number;
incrementing the request frequency counter when the total number of access requests received over the period of time is less than the request threshold number;
generating a legacy advanced technology attachment (ATA)-type command for the first new access request when the request frequency counter is greater than or equal to a request frequency counter threshold number; and generating a native command queue (NCQ)-type command for the first new access request when the request frequency counter is less than the request frequency counter threshold number.

2. The method of claim 1, further comprising:
determining if there is at least one pending access to the mass storage device that has not completed; and
when at least one pending request has not been completed, determining whether the at least one pending access is of a different type than the generated command, waiting for the current at least one pending request to be completed prior to sending the generated command to the mass storage disk.

3. The method of claim 2, further comprising:
sending the generated command to the mass storage disk when the mass storage disk provides an indication that all of the at least one pending accesses have completed.

4. The method of claim 1, further comprising:
receiving a second new access request to the mass storage disk;
resetting the request frequency counter when the second new access request is received at least predetermined lapsed time after the first new access request is received.

5. The method of claim 1, further comprising:
restoring the request frequency counter to the request frequency counter threshold number when the request frequency counter is incremented past the request frequency counter threshold number.

6. The method of claim 1, further comprising:
detecting whether the mass storage disk supports NCQ-type commands;
setting a driver of the mass storage drive to support dynamically changing the access request command type per request if the mass storage disk supports NCQ-type commands.

7. A device, comprising:
storage driver logic to:
receive a first new access request to a mass storage disk;
determine a total number of access requests to the mass storage disk received in a window of time, the window of time starting at a first point in time and ending at the time of the receipt of the first new access request;
decrement a request frequency counter when the total number of access requests received over the period of time is greater than or equal to a request threshold number;
increment the request frequency counter when the total number of access requests received over the period of time is less than the request threshold number;
generate a legacy advanced technology attachment (ATA)-type command for the first new access request when the request frequency counter is greater than or equal to a request frequency counter threshold number; and
generate a native command queue (NCQ)-type command for the first new access request when the request frequency counter is less than the request frequency counter threshold number.

8. The device of claim 7, wherein the storage driver logic is further operable to:
determine if there is at least one pending access to the mass storage device that has not completed; and
when at least one pending request has not been completed, determining whether the at least one pending access is of a different type than the generated command, wait for the current at least one pending request to be completed prior to sending the generated command to the mass storage disk.

9. The device of claim 8, wherein the storage driver logic is further operable to:
send the generated command to the mass storage disk when the mass storage disk provides an indication that all of the at least one pending accesses have completed.

10. The device of claim 7, wherein the storage driver logic is further operable to:
receive a second new access request to the mass storage disk;
reset the request frequency counter when the second new access request is received at least predetermined lapsed time after the first new access request is received.

11. The device of claim 7, wherein the storage driver logic is further operable to:
restore the request frequency counter to the request frequency counter threshold number when the request frequency counter is incremented past the request frequency counter threshold number.

12. The device of claim 7, wherein the storage driver logic is further operable to:
detect whether the mass storage disk supports NCQ-type commands;
set a driver of the mass storage drive to support dynamically changing the access request command type per request if the mass storage disk supports NCQ-type commands.

13. A system, comprising:
a memory to store an operating system;
a mass storage disk;
and storage driver logic to:
receive a first new access request to the mass storage disk from the operating system;
determine a total number of access requests to the mass storage disk received in a window of time, the window of time starting at a first point in time and ending at the time of the receipt of the first new access request;
decrement a request frequency counter when the total number of access requests received over the period of time is greater than or equal to a request threshold number;
increment the request frequency counter when the total number of access requests received over the period of time is less than the request threshold number;
generate a legacy advanced technology attachment (ATA)-type command for the first new access request when the request frequency counter is greater than or equal to a request frequency counter threshold number; and
generate a native command queue (NCQ)-type command for the first new access request when the request frequency counter is less than the request frequency counter threshold number.

14. The system of claim 13, wherein the storage driver logic is further operable to:
determine if there is at least one pending access to the mass storage device that has not completed; and
when at least one pending request has not been completed, determining whether the at least one pending access is of a different type than the generated command, wait for the current at least one pending request to be completed prior to sending the generated command to the mass storage disk.

15. The system of claim 14, wherein the storage driver logic is further operable to:
  send the generated command to the mass storage disk when the mass storage disk provides an indication that all of the at least one pending accesses have completed.

16. The system of claim 13, wherein the storage driver logic is further operable to:
  receive a second new access request to the mass storage disk;
  reset the request frequency counter when the second new access request is received at least predetermined lapsed time after the first new access request is received.

17. The system of claim 13, wherein the storage driver logic is further operable to:
  restore the request frequency counter to the request frequency counter threshold number when the request frequency counter is incremented past the request frequency counter threshold number.

18. The system of claim 13, wherein the storage driver logic is further operable to:
  detect whether the mass storage disk supports NCQ-type commands;
  set a driver of the mass storage drive to support dynamically changing the access request command type per request if the mass storage disk supports NCQ-type commands.

19. A method, comprising:
  receiving a new access request to a mass storage disk;
  determining a total number of access requests to the mass storage disk received in a window of time, the window of time starting at a first point in time and ending at the time of the receipt of the new access request;
  generating a native command queue (NCQ)-type command for the new access request when the total number of access requests received over the period of time is greater than or equal to a request threshold number; and
  generating a legacy advanced technology attachment (ATA)-type command for the new access request when the total number of access requests received over the period of time is less than the request threshold number.

20. The method of claim 1, further comprising:
  waiting for the current pending requests to be completed prior to sending the generated command to the mass storage disk when the current pending requests are of a different type than the generated command.

21. The method of claim 1, further comprising:
  detecting whether the mass storage disk supports NCQ-type commands;
  setting a driver to support dynamically changing the access request command type per request if the mass storage disk supports NCQ-type commands.

* * * * *

UNITED STATES PATENT AND TRADEMARK OFFICE
CERTIFICATE OF CORRECTION

PATENT NO.         : 8,161,234 B2                                              Page 1 of 1
APPLICATION NO.    : 12/590192
DATED              : April 17, 2012
INVENTOR(S)        : Ooi Eng Hun It is certified that error appears in the above-identified patent and that said Letters Patent is hereby corrected as shown below:

On the first page, below "Prior Publication Data" insert -- (30) Foreign Application Priority Data Dec. 30, 2008 (MY).............. PI 20085359. --

Signed and Sealed this
Twenty-fifth Day of September, 2012

David J. Kappos
*Director of the United States Patent and Trademark Office*